Figure 1:
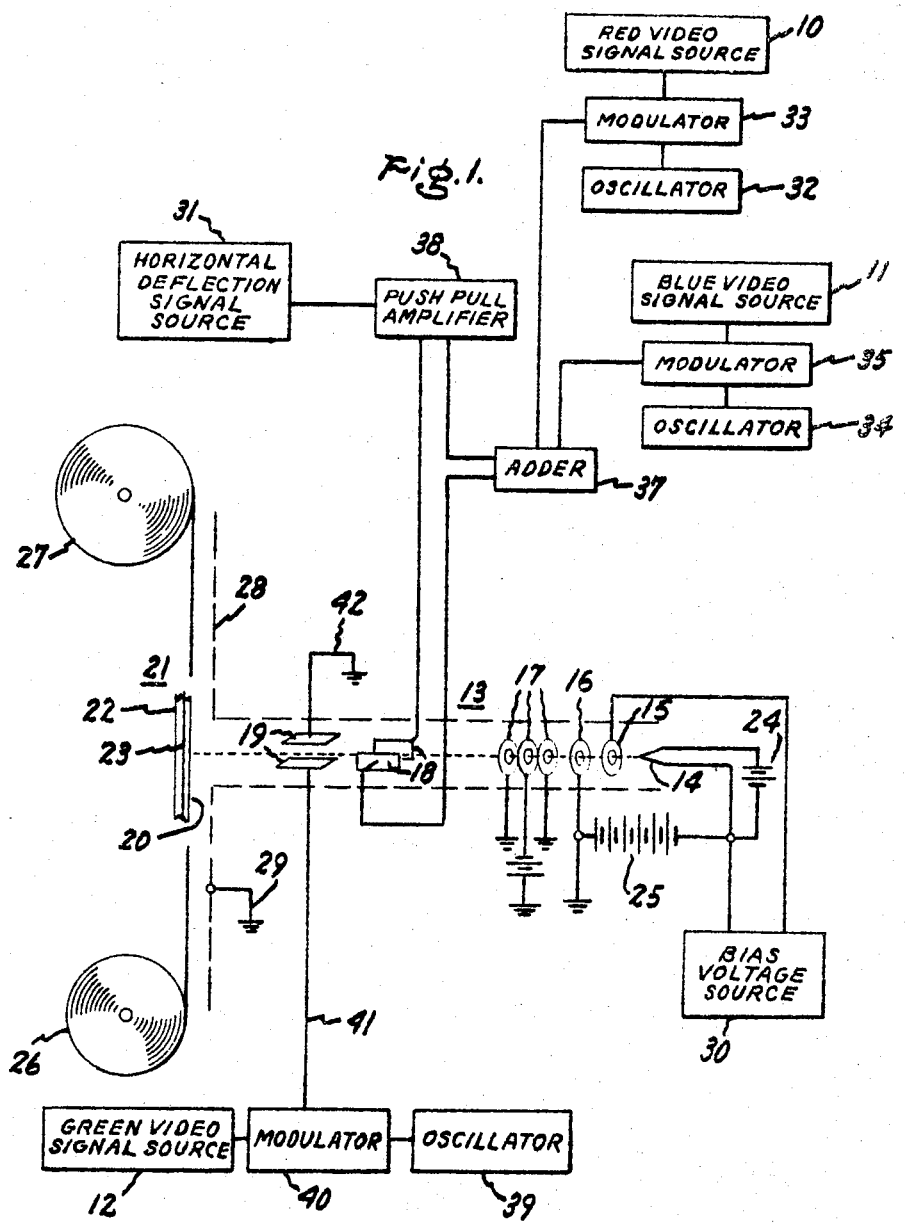

Sept. 6, 1966   W. E. GLENN, JR   3,270,613
COLORED LIGHT PROJECTION SYSTEM
Filed Nov. 1, 1963   2 Sheets-Sheet 1

Inventor:
William E. Glenn Jr.,
by Richard R. Brainard
His Attorney.

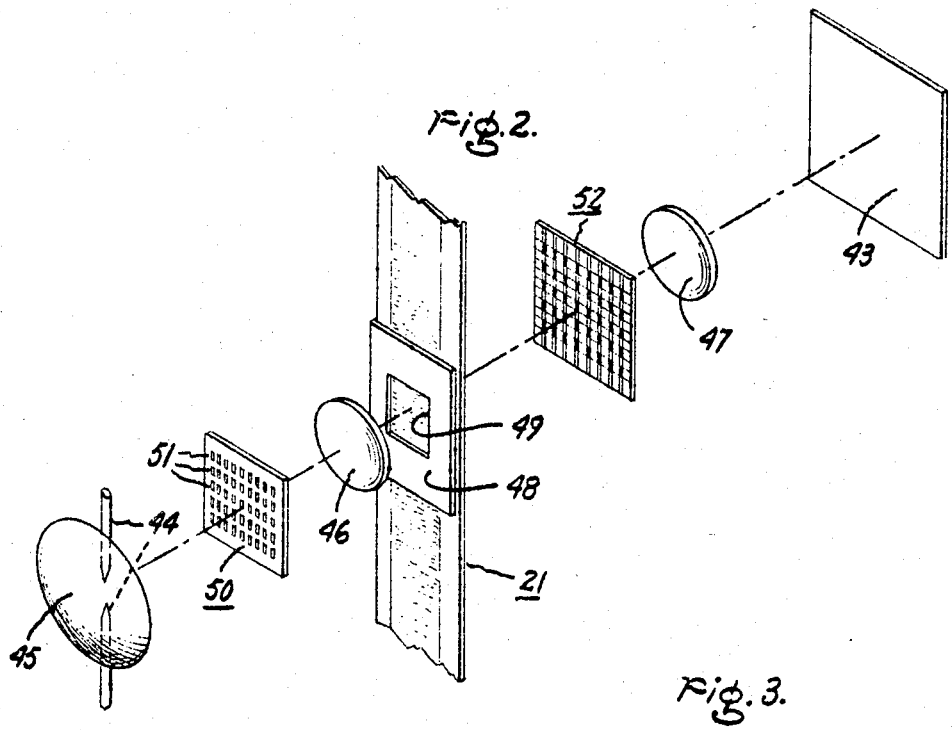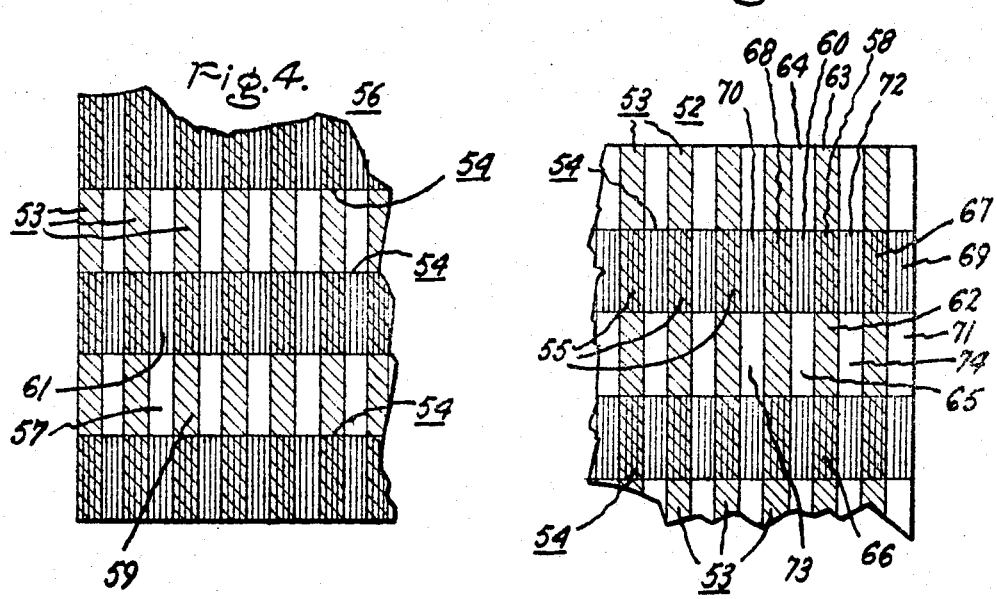

United States Patent Office 3,270,613
Patented Sept. 6, 1966

3,270,613
COLORED LIGHT PROJECTION SYSTEM
William E. Glenn, Jr., Scotia, N.Y., assignor to General Electric Company, a corporation of New York
Filed Nov. 1, 1963, Ser. No. 320,894
12 Claims. (Cl. 88—24)

This application is a continuation-in-part of my application Serial No. 49,746, filed August 15, 1960, and assigned to the assignee of this application, now abandoned.

The present invention relates to an improved colored light projection system and particularly to such a system for use with a light-controlling medium for controlling the transmission or reflection of light in accordance with the color picture or other color information impressed on the medium in the form of physical deformations.

In my Patent No. 2,813,146 dated November 12, 1957, entitled "Colored Light System," now Reissue No. 25,169, granted May 15, 1962, color information impressed on a light controlling medium in the form of a plurality of superimposed diffraction patterns corresponding respectively to a plurality of color components is projected by means of light masking system which selects color by passing substantially only the first order diffraction from each diffraction pattern corresponding to a color component.

In an improved color projection system such as the one described and claimed in my copending application Serial No. 799,295, filed March 13, 1959, as a continuation-in-part of my application Serial No. 782,955, filed December 24, 1958 (now abandoned), and entitled "Electrical Signal Transducer Optical System," now Patent No. 3,078,338, granted February 19, 1963, the superimposed diffraction patterns are orthogonally arranged, i.e., the diffraction pattern corresponding to one color component extends orthogonally with respect to the diffraction pattern or patterns corresponding to the remaining color information to be projected. In the masking system there shown separate masking areas, specifically in the form of bars and slots, are provided to block the zero order or undiffracted light and pass the first order diffracted light corresponding to the color information of the respective orthogonally arranged diffraction gratings. The orthogonal arrangement minimizes certain inner action or beats between the color information contained in the orthogonally arranged gratings. The light transmitted through the separate masking systems is combined optically to project the complete color image.

In accordance with a generically similar optical projection system embodying further improvements and disclosed and claimed in my application Serial No. 835,208, filed August 21, 1959, now Patent No. 3,118,969, entitled "Modified Color Optical System," the color selecting requirements of the masking system associated with the diffraction grating corresponding to a single color component is eliminated. This is accomplished in the embodiment there illustrated by providing light corresponding to the single component only in the optical path including the masking system corresponding to that single color. This eliminates the necessity of color selection by one of the masking systems and permits the masking system corresponding to the diffraction grating corresponding to that single color to be relatively open since many orders of diffraction may be passed. This permits more light to pass, giving a brighter picture and it also improves the resolution of the system with respect to that color.

The present invention relates to a still further improvement in colored light projection systems, particularly useful in connection with light controlling mediums in which the color information to be projected is contained in orthogonally arranged light diffraction gratings. In accordance with a specific embodiment of the present invention, the projected color information is controlled by a light source, focusing system and a light controlling medium including orthogonally arranged diffraction patterns in combination with a color filter masking system including spaced parallel strips corresponding to a single color component and extending in the direction of diffraction produced by the diffraction grating corresponding to that single color component and a second set of spaced parallel filter strips corresponding in color to the remaining light to be projected. In a specific embodiment the single color is green and the remaining colored light is magenta. The filter mask described includes areas where the filter strips cross which are opaque, areas which constitute a green filter, areas which constitute a magenta filter and clear areas. When used in conjunction with the light controlling medium, light impinging on the medium is focused on the opaque areas of the filter mask when the light controlling medium is undeformed, i.e., produces no diffraction. Deformations corresponding to green light diffract the light through the green areas of the filter while deformations corresponding to red, blue, or magenta light diffract the light through the magenta filter areas. Combinations of the green and either red or blue may pass through the clear areas. Such a system minimizes undesirable interaction between the light projected under the control of the orthogonally arranged diffraction patterns and the brightness is greater for light such as yellow, cyan, or white resulting from combinations of the green and magenta components. With the improved projection system errors in the position of the light modulating medium with respect to the focus of the lens focusing undiffracted light on the opaque areas of the mask produces less error in the image shading. The filter mask system of the present invention also is cheaper than systems using dichroic mirrors and the width of the filter strips in one direction may be adjusted relative to the filter strips in the orthogonal direction to enhance one color with respect to the other.

It is accordingly an important object of my invention to provide an improved color information projection system for use in connection with the projection of information contained in orthogonally arranged diffraction patterns of light controlling medium, particularly with respect to the color quality and brightness of the projected image.

Further objects and advantages of my invention will become apparent as the following description proceeds, reference being had to the accompanying drawings and its scope will be pointed out in the appended claims. In the drawing, FIG. 1 is a schematic representation of an electron beam apparatus for impressing diffraction patterns on a light controlling medium of a type suitable for use in the color projection systems of my present invention;

FIG. 2 is a schematic representation of a color projection system embodying my invention; and FIG. 3 is an enlarged view of a color filter mask embodying my invention.

Before describing the color projection system embodying my present invention, a suitable system and method for writing color information on a light modulating medium will be briefly described by reference to FIG. 1 of the accompanying drawing which illustrates schematically a system for impressing color information corresponding to color television pictures on a tape having a thermoplastic recording layer. Apparatus and method for thermoplastic recording of information, particularly information contained in electrical signals, is described and broadly claimed in my copending application Serial No. 8,842, filed February 15, 1960, now Patent No.

3,113,179, which application is a continuation-in-part of my application Serial No. 698,167, filed November 22, 1957 (now abandoned), and also a continuation-in-part of my application Serial No. 783,584 (now abandoned), filed December 29, 1958, the latter application also being a continuation-in-part of said application Serial No. 698,167. Mediums for recording information on a thermoplastic surface in accordance with the apparatus and method of my aforementioned application Serial No. 8,842, are described and claimed in application Serial No. 84,424, filed January 23, 1961, now Patent No. 3,147,062, as a division of said application Serial No. 8,842.

Systems embodying the diffraction of different component colors in orthogonal directions are disclosed and claimed in my aforementioned copending applications Serial No. 799,295, filed March 13, 1959, and Serial No. 835,208, filed August 21, 1959. The electron beam system of FIG. 1 is similar to that described in FIG. 4 of application Serial No. 835,208.

Referring now to FIG. 1, there is illustrated an apparatus for recording color information corresponding to the color television signals representing the red, blue and green video signal sources 10, 11, and 12, respectively. The recording is accomplished by an electron beam apparatus 13 including a filamentary cathode 14, an annular grid 15, an annular anode 16, three annular lens members 17, horizontal electrostatic deflection plates 18, and vertical electrostatic deflection plates 19. The beam impinges on a thermoplastic surface 20 of a recording tape 21 which may include a heavier transparent backing layer 22 and an intermediate transparent conducting layer 23.

The cathode 14 is energized by a source of heater voltage 24 and emits electrons under the control of grid 15 which are accelerated by anode electrode 16 which is maintained at a high positive voltage with respect to the cathode by a direct current source illustrated as a battery 25. The electron beam is focused by a known type of lens illustrated as the three annular disks 17 having the intermediate disk maintained in a negative voltage with respect to the two outer disks which are conveniently maintained at ground potential. The focused beam which is preferably of a small cross section, i.e., approximately 0.2 mil, impinges on the thermoplastic layer 20 to establish charge patterns thereon determined by the relative movement of the tape and beam and corresponding in density and distribution to the color information to be recorded.

As illustrated, the tape is supplied from a reel 26 and moved past the area of the beam to a take-up reel 27. The reels 26 and 27 and the tape are housed within a vacuum-type enclosure indicated schematically at 28 and maintained at ground potential as shown at 29. In the embodiment illustrated the electron beam is substantially uniform in intensity which is established by the bias voltage 30 supplied to the grid electrode 15. The beam may also be shut off completely during retrace by a blanking signal voltage source (not shown) applied to the electrode in accordance with usual television practice.

The deflection of the beam in a horizontal direction is accomplished by the horizontal deflection voltage impressed on plates 18 by the deflection signal source 31. In accordance with normal practice, this voltage may have a repetition rate to produce 15,750 raster lines per second. The red and blue color information is impressed on the thermoplastic medium by velocity modulating the horizontal deflection by voltages having a frequency representative of those color components and amplitudes varying in accordance with the intensity of those components. The oscillator for red video information is shown at 32 with its output connected to the modulator 33 by which it is amplitude modulated in accordance wth the output of the red video signal source. The frequency of the oscillator 32 may be 15 megacycles for example. In a similar manner, the oscillator for the blue component is shown at 34 and supplies a modulator 35 by which the oscillator output is amplitude modulated in accordance with the blue video signal source 11. The frequency of oscillator 35 may be 10 megacycles, for example. The outputs of modulators 33 and 35 are added together in a circuit shown schematically at 37. The output of the adder circuit is superimposed on the horizontal deflection voltage provided by the amplifier 38 and impressed on the horizontal deflection plates 18. It will be readily understood as described in detail in my aforementioned Patent No. 2,813,146 that the beam is deflected at a non-uniform rate dependent upon the color information contained in the output of the adder circuit 37. It is slowed down and speeded up relative to the normal deflection velocity, at frequencies corresponding to the outputs of oscillators 32 and 34 and by amounts dependent upon the amplitudes of these signals. The result, since the beam is of constant intensity, is to provide along the horizontal deflection line areas of increased and decreased charged densities which occur at frequencies corresponding to the frequencies of the oscillators 32 and 34 and in magnitudes varying with the magnitudes of the red and blue video signals supplied by sources 10 and 11.

The green color information is established as a charge pattern on the thermoplastic layer 20 by the voltage impressed on the vertical deflection plates 19. This voltage includes the output of oscillator 39 which is modulated in amplitude in accordance with the output of the green video signal source 12 by the modulator 40 and connected to one of the deflection plates by conductor 41, the other deflection plate being grounded as shown at 42. The oscillator 39 is of relatively high frequency compared to the blue and red oscillators 34 and 32, for example, in the order of 50 megacycles. The line of charge corresponding to the raster line is smeared or spread (as the result of what may be considered a vertical wobble of the beam by an amount dependent upon the amplitude of the green video signal). The maximum charge density, i.e., the least vertical deflection, occurs when the green video signal is of smallest amplitude. Since the maximum charge density corresponds to the maximum intensity of green light to be transmitted, the green video signal must be an inverted signal, i.e., a signal having a maximum amplitude when the green color is of minimum intensity. In other words, the green information is impressed on the medium as a line of charge density varying directly with the intensity of green color component of the information to be recorded.

As illustrated, the tape is handled by reels 26 and 27 which are adapted to move the tape in a vertical direction at a constant speed suitably selected to produce a 525-line raster of desired vertical dimension. As will be readily appreciated, the tape movement and the beam scanning are synchronized by suitable means (not shown).

The thermoplastic layer of the tape is deformed in accordance with the charge pattern by heating it any time after the charge pattern is established and before the charge pattern has been dissipated. It may be accomplished immediately within the housing 28 by high frequency heating of the conducting layer 23 or it may be developed by heating with hot air after the tape is removed from the housing 28. Both of these methods are described in my aforementioned application Serial No. 8,842.

As a result of the writing method described, color information is contained in deformations in the thermoplastic medium 21 in the form of phase diffraction gratings spaced along the raster line and extending in a direction perpendicular to the raster line. These gratings represented the red and blue color information and are in superimposed relationship. Also occupying the same raster line will be a variation in charge density and as a result, a variation in the depth of a single horizontally extending depression corresponding to intensity of the green component information. While the green information, being stored as a single line is in a strict sense reproduced by refraction of the projected light, the variations in depth of this line as well as the variations of the diffraction gratings corresponding to the red and green information will be referred to as diffraction gratings and as extending in orthogonal directions.

In FIGS. 2 and 3 are illustrated a preferred embodiment of my invention which is suitable for use in connection with a light modulating medium having deformations of the type just described in connection with the color information writing system of FIG. 1. As illustrated in FIG. 2, the optical system includes a screen 43, for displaying a color image corresponding to the color information stored in a thermoplastic tape 21 and projected by a system including a light source illustrated schematically as a pair of arc electrodes 44 and a reflector 45. A focusing lens 46 is positioned between the tape 21 and the source 44 and a projection lens 47 is positioned between the tape 21 and the screen 43. A suitable opaque frame 48 having a rectangular aperture 49 corresponding in size to the raster area on the tape is provided. A light masking system for blocking undiffracted light and selectively passing light in according with the color information stored on the tape 21 is provided by a mask 50 interposed between the light source 44 and the lens 46 and including rows of rectangular transparent areas or openings 51 and a filter mask 52 interposed between the medium and the projection lens 47 and forming an important feature of the present projection system. As better shown in FIG. 3, the filter mask 52 includes a number of vertically extending green filter strips 53 which pass green light only and a number of spaced parallel magenta filter strips 54 extending at right angles to and optically overlying the green filter strips 53. The intersections of these strips 53 and 54 provide a plurality of rectangular opaque areas 55. The mask 52 is positioned in the projection system so that light which passes through the transparent areas 51 of the mask 50 and is focused (undiffracted by tape 21) on the opaque areas 55 of the filter mask 52. Preferably, the spots are of substantially less width than the opaque areas and, for example, may be about half the width of the opaque areas.

The manner in which the mask 52 cooperates with the deformed light modulating medium provided by the tape 21 and the mask 49 to project light corresponding point-by-point with the color information on the tape 21 will now be described. As previously pointed out, the undiffracted light falls on the opaque areas 55. Considering now only the green information, the variations in depth of the horizontal extending raster line is effective to diffract (or strictly speaking refract) light along the green filter strips 53 so that it passes through corresponding positions of the green strips included between the opaque areas on which it was originally focused and the opaque areas provided by the intersections of those strips and the next magenta strips. The amount of light passing through this filter is dependent upon the depth of this horizontal depression in the recording medium. Since only green light passes through the green filter strips 53, color selection is not required by the width or spacing of the opaque areas. This makes it possible for the openings, i.e., the spacings between the magenta strips to be much wider than they would be if the color selection were accomplished by the spacings of the masking system. Superimposed on the medium are the diffraction gratings corresponding point-by-point with the red and blue information. The frequencies of the red and blue oscillators, the dimensions and spacings of the filter strips, and the optics of the system are chosen so that the diffraction of light along the magenta strips caused by these red and blue diffraction gratings is effective to select the color and to transmit light varying in amount in accordance with the intensity of that color. Since the red and blue are at opposite ends of the spectrum this masking system requires considerably less selecting ability than one which makes the selection for the entire color spectrum or color content of the picture. This opening up of the masking system improves the resolution and amount of light transmission without adversely affecting the purity of the colors. Assuming the presence on the medium 21 of only a grating corresponding to blue light, light is diffracted along the magenta strips so that the blue light passes through the magenta filter in the region between the opaque area on which the undiffracted light falls and the next adjacent opaque area which latter area intercepts the red light. If the grating on medium 21 corresponds in wave length to red light only, the blue part of the spectrum is blocked by the same opaque area as blocks the red light in the above example. The first order red light is passed, however, by the second magenta area from the opaque area which blocks the zero order light. The correlation of the grating spacing and the center wavelength of the light components to be passed through the first and second spaces from the opaque area blocking the zero order light is a feature of the invention claimed in my copending application Serial No. 320,912, filed concurrently herewith, which application is also a continuation-in-part of my application Serial No. 49,746, filed August 15, 1960.

The dimensions of the bars for color selection are derivable in accordance with the well-known relationship $$\frac{N\lambda}{S} = \frac{I}{D}$$

where N is the order of the diffraction pattern and is one (first order diffraction) in the explanation given above. $\lambda$ is the wave length of the light under consideration. S is the spacing or wave length of the diffraction grating on the modulating medium under consideration and D is the distance from the light modulating medium to the filter mask 52. I is the distance from zero order to the location of the Nth order diffracted light having the wave length $\lambda$.

While these considerations are well-known and have been described in detail in the earlier applications referred to, it may be helpful to point out that in a system utilizing an ordinary television raster of 525 lines and approximately 0.8 cm. high by 1 cm. wide and with the frequencies of 10 megacycles for blue and 15 megacycles for red and with a distance D of approximately 4.5 cm., the filter mask included green strips of approximately 1 mm. width and 1 mm. spacing while the magenta strips were approximately 2.5 mm. in width and 2.5 mm. spacing. As previously indicated, the width and spacing of the magenta strips is not at all critical since they are, in effect, passing white light since the total color selection is accomplished by the fact that only one color is to be transmitted through the green strips.

In the foregoing detailed description the improved filter mask of the present invention and its operation in the improved color projection system has been described with the filter mask placed between the light modulating medium and the projection screen. It will be understood that masks 52 and 50 may be essentially interchanged in position. In a sense, this arrangement provides two sets of light beams of different colors, namely green and magenta which are then diffracted through the openings 51 of mask 50 in accordance with the color information.

Even more of the light available from source 44 may be projected upon the screen 43 if both the input and output masks are made up of filter strips similar to the output mask 52. It will be appreciated that the transparent or open areas of the input mask 50 will be imaged upon the opaque or overlapping areas of the green and magenta filters in the output mask 52. In FIG. 4 I have shown in detail a portion of an input filter mask 56 for cooperating with the output mask 52. The magenta and green filter strips have been similarly illustrated at 54 and 53. The manner in which such a combination of filter masks operate will be apparent from a consideration of the location of each of the different areas of the input mask with respect to the output mask.

Referring to FIG. 4 and considering the transparent area 57, this area is imaged upon the opaque area 58 on the output mask. Green area 59 of the input mask 56 is imaged on the magenta area 60 of the output mask 52 and the magenta area 61 is imaged on the green area 62 of the output mask. Thus, when the modulating medium 21 within the aperture 49 is undeformed, light from transparent area 57 is intercepted by the opaque area 58. Light passing the green area 59 is imaged upon and intercepted by magenta area 60. Likewise the light passing the magenta area 61 is intercepted by the green area 62 and no light is transmitted to the screen 43. If the medium 21 is deformed by a green signal only, the white light passed by opening 57 of the input mask is diffracted along the green strip and falls on green areas 62 and 63 of the output mask to transmit green light to the area of the screen 43 corresponding to the deformed area of the medium 21. The green light passed by the green area 59 of the input filter is diffracted from magenta area 60 of output mask 56 to transparent areas 64 and 65 of the output mask and is transmitted as green light to the screen and magenta light passed by area 61 of the input filter is diffracted from green area 62 to opaque areas 58 and 66 of the output mask and is intercepted.

If the medium 21 is deformed according to the presence of a red signal only, light is diffracted horizontally as viewed in FIG. 3. The white light passed by area 57 is diffracted so that the blue portion of the spectrum is intercepted by the first opaque areas 67 and 68 horizontally displaced from the opaque area 58 on which the zero order or undiffracted white light is intercepted and the red light passes through the second magenta area out from the opaque area on which the undiffracted white light is intercepted. These transparent areas are designated 69 and 70. The green light passed by area 59 of the input mask 56 is diffracted from the magenta area 60 on which it is imaged originally to opaque areas 58 and 68 and is not transmitted to the screen 43. The light passed by magenta area 61 of the input mask 56 is diffracted from the green area 62 by an amount so that the red portion of the spectrum is passed through the second transparent areas out from the green area 62 and designated 71 and 73.

In a similar manner if a blue signal only is impressed on medium 21 the white light passed by opening 57 is diffracted horizontally from area 58 of the output mask 56 by an amount so that the red is intercepted by the first opaque areas 67 and 68 and blue light passes through the magenta areas 60 and 72 adjacent the opaque area 58 on which the undiffracted white light was intercepted. Again the green light passed by area 59 of the input mask is diffracted along the magenta strip and is intercepted. The magenta light passed by area 61 of the input mask 56 is diffracted horizontally from green area 62 by such an amount that the blue portion thereof passes through the transparent areas 65 and 74 adjacent the green area 62.

In the foregoing description of the operation the discussion of the diffracted or deviated light has been for the first order only. It will be appreciated that since the filter mask 56 is designed to block the unwanted portions of the spectrum, to the extent that the higher orders are displaced integral multiple distances, they will also be blocked. This relationship holds for amplitudes of modulation of the medium which are relatively small compared to the wavelength of the gratings and accordingly this is a condition which is adhered to for the preferred operation of the system described in this application.

Also the analysis of the operation in the above description has been made by considering the impression of signals corresponding to single colors on the modulating medium. It will be understood that these may be superimposed and the analysis remains essentially accurate as long as the depth of the deformations is maintained small compared to the wavelength of these deformations. This is a practice which is also followed in carrying out the present invention.

It will also be appreciated that the medium 21 is imaged on screen 43 and that deformations at a given point in the medium 21 result in the passage of light through the different areas of the output mask 56 as described and are imaged on a point on the screen 43 corresponding to the given point of the medium. Thus a pattern of deformations over the picture area of the medium 21 corresponding to a predetermined color distribution result in that same color distribution over the picture area of the screen 43.

For convenience the filter masks have been described as made up of orthogonally arranged filter strips and this terminology is convenient for description purposes. It will be apparent, however, that this structure results in a mesh of a plurality of light controlling areas in parallel with each group of areas including a magenta area, a green area, an opaque area and a transparent area and the terminology is intended to include such a filter mask whether actually produced by the orthogonally arranged strips or whether made up of individual green, magenta, opaque and transparent elements, for example.

Also, the present invention which has been described only in connection with a light transmission type of projection may be used in equal advantage in a reflector-type system as shown, for example, in my aforementioned Patent No. 2,813,146 and more specifically in my application Serial No. 835,208. It will also be apparent that the single color component may be red, for example, instead of green and the remaining light will then be cyan. Any multicolor component color system may be employed and the filter strips will, of course, correspond.

While I have described and illustrated particular embodiments of my invention, it will be apparent to those skilled in the art that changes and modifications may be made without departing from my invention in its broader aspects, and I intend therefore to cover all such changes and modifications as fall within the true spirit and scope of my invention.

What I claim as new and desire to secure by Letters Patent of the United States is:

1. An optical system for projecting colored light representative point-by-point of the color information contained in a light modulating medium in the form of deformations which diffract light corresponding to one color to be projected in a given direction and diffract light corresponding to the remaining colored light to be projected in a direction normal to said given direction comprising a filter color mask interposed in the path of light controlled by the medium and comprising a first plurality of spaced parallel filter strips of said one color and extending in the direction of diffraction of said one color and a plurality of spaced filter strips of the color of said remaining colored light and extending in the direction of diffraction of said remaining colored light and optically overlying said first plurality of filter strips, the overlying areas of said filter strips forming opaque areas, said system providing light source and focusing means for focusing undiffracted light impinging on said medium on said opaque areas.

2. A light projection system for producing a colored display corresponding to color information contained in a light controlling medium in the form of orthogonally arranged diffraction gratings, the diffraction gratings extending in one direction corresponding to one color to be projected and the diffraction gratings extending orthogonally thereto corresponding to the remaining color to be projected, said system comprising light source and focusing means for illuminating said medium and a color filter and light masking means including a plurality of spaced parallel filter strips of said one color extending in the direction of diffraction by said one diffraction grating and a plurality of spaced parallel filter strips corresponding to the remaining color extending orthogonally to said first named filter strips and optically superimposed thereon and in the projection path of light provided by said source and impinging on said medium, said color filter and light masking means cooperating with said source and focusing means and said medium to block undiffracted light and to project light corresponding to the color information contained in the orthogonally arranged gratings of said medium.

3. A light projection system for producing a colored display corresponding to color information contained in a light controlling medium in the form of orthogonally arranged diffraction gratings, the diffraction gratings extending in one direction corresponding to one color to be projected and the diffraction gratings extending orthogonally thereto corresponding to the remaining color to be projected, said system comprising a color filter light masking means including a plurality of spaced parallel filter strips of said one color extending in the direction of diffraction by said one diffraction grating and a plurality of spaced parallel filter strips corresponding to the remaining color to be projected extending othogonally to said first named filter strips and optically superimposed thereon to provide a filter mask having opaque areas, transparent areas, and areas corresponding respectively to said one color and said remaining color, light source and focusing means for illuminating said medium and focusing light impinging on said medium on said opaque areas when said light is undiffracted by said medium and diffracting light proportional to the intensity of the information of said one color through areas of said filter of said one color and diffracting light proportional to the intensity of the remaining color information through said corresponding color areas and diffracting light corresponding to certain combined colors of said diffraction gratings through said transparent areas.

4. An optical system for projecting on a screen colored light representative point-by-point of the color information contained in a light modulating medium in the form of deformations which diffract light corresponding to one color to be projected in a given direction and diffract light corresponding to the remaining colored light to be projected in a direction normal thereto comprising a source of light for illuminating said medium, a filter color mask interposed in the path of light from said source comprising a first plurality of spaced parallel filter strips of said one color and extending in the direction of diffraction of light corresponding to said one color and a plurality of spaced filter strips of the color of said remaining colored light and extending in the direction of diffraction of light corresponding to said remaining colored light and optically overlying said first plurality of filter strips, the overlying areas of said filter strips forming opaque areas and masking means cooperating with said filter color mask and said medium to reproduce on said screen a colored light display corresponding to the color information represented by said diffraction patterns.

5. An optical system for projecting on a screen colored light representative point-by-point of the color information contained in a light modulating medium in the form of deformations which diffract light corresponding to green light to be projected in a given direction and diffract magenta light to be projected in a direction normal thereto comprising a source of light for illuminating said medium, a filter color mask interposed in the path of light from said source comprising a first plurality of spaced parallel green filter strips and extending in the direction of diffraction of light corresponding to green light and a plurality of spaced magenta filter strips and extending in the direction of diffraction of light corresponding to magenta light and optically overlying said first plurality of filter strips, the overlying areas of said filter strips forming opaque areas and masking means cooperating with said filter color mask and said medium to reproduce on said screen a colored light display corresponding to the color information represented by said diffraction patterns.

6. A light projection system for producing a colored display corresponding to color information contained in a light controlling medium in the form of orthogonally arranged diffraction gratings, the diffraction gratings extending in one direction corresponding to green and the diffraction gratings extending orthogonally thereto corresponding to magenta, said system comprising light source and focusing means for illuminating said medium and a color filter and light masking means including a plurality of spaced parallel green filter strips extending in the direction of diffraction of light corresponding to green light and a plurality of spaced parallel magenta filter strips extending orthogonally to said green filter strips and optically superimposed thereon and in the path of light provided by said source and impinging on said medium, said color filter and light masking means cooperating with said source and focusing means and said medium to block undiffracted light and to project light corresponding to the color information contained in the orthogonally arranged gratings of said medium.

7. A light projection system for producing a colored display corresponding to color information contained in a light controlling medium in the form of orthogonally arranged diffraction gratings, the diffraction gratings extending in one direction corresponding to green light to be projected and the diffraction gratings extending orthogonally thereto corresponding to magenta light to be projected, said system comprising a color filter light masking means including a plurality of spaced parallel green filter strips extending in the direction of diffraction by said one diffraction grating and a plurality of spaced parallel magenta filter strips corresponding to the magenta light extending orthogonally to said first named filter strips and optically superimposed thereon to provide a filter mask having opaque areas, transparent areas, and areas corresponding respectively to green and magenta, light source and focusing means for illuminating said medium and focusing light impinging on said medium on said opaque areas when said light is undiffracted by said medium and cooperating with said medium to diffract light proportional to the intensity of the green light to be projected through areas of said green filter and diffract light corresponding to components of magenta light to be projected through said magenta strip and diffract light corresponding to certain combined colors of said diffraction gratings through said transparent areas.

8. An optical system for projecting colored light representative point-by-point of the color information contained in a light modulating medium in the form of deformations which diffract light corresponding to one color in a given direction and deformations of different spacings corresponding to different colors which differently diffract light corresponding to different colors in a direction orthogonal to said given direction comprising a filter color mask interposed in the path of light controlled by the medium and comprising a first plurality of spaced parallel filter strips of said one color and extending in the direction of diffraction of light corresponding to said one color and a plurality of spaced filter strips of the color of the sum of said different colors and extending in the direction of diffraction of light corresponding to said different colors and optically overlying said first plurality of filter strips, the overlying areas of said filter strips forming opaque areas, said system providing light source and focusing means for focusing undiffracted light impinging on said medium on said opaque areas and said first filter strips having widths and spacings so that the portions of said second filter strip between said opaque areas are positioned and dimensioned to cooperate with said deformations of different spacings to select by the different amounts of diffraction the color of the light transmitted thereby in accordance with the different spacings of said deformations.

9. An optical system for projecting colored light representative point-by-point of the color information contained in a light modulating medium in the form of deformations which diffract light corresponding to one primary color in a given direction and deformations of different spacings corresponding to different colors of the remaining colors in white light which differently diffract light corresponding to different colors in a direction orthogonal to said given direction comprising a filter color mask interposed in the path of light controlled by the medium and comprising a first plurality of spaced parallel filter strips of said one primary color and extending in the direction of diffraction of light corresponding to said one primary color and a plurality of spaced filter strips of the color of the sum of said remaining colors and extending in the direction of diffraction of said light corresponding to said remaining colors and optically overlying said first plurality of filter strips, the overlying areas of said filter strips forming opaque areas, said system providing light source and focusing means for focusing undiffracted light impinging on said medium on said opaque areas and said first filter strips each having a width and spacing so that the portions of said second filter strip between said opaque areas are positioned and dimensioned to cooperate with said deformations of different spacings to select by the different amounts of diffraction the colored light transmitted thereby from said remaining colors in accordance with the different spacings of said deformations.

10. An optical system for projecting colored light representative point-by-point of the color information contained in a light modulating medium in the form of deformations which diffract light corresponding to green in a given direction and deformations of different spacings corresponding to red and blue, respectively which diffract light corresponding to the red and blue components of magenta by different amounts in a direction orthogonal to said given direction comprising a filter color mask interposed in the path of light controlled by the medium and comprising a first plurality of spaced parallel green filter strips extending in the direction of diffraction of light corresponding to green and a plurality of spaced parallel magenta filter strips extending in the direction of diffraction of magenta and optically overlying said plurality of green filter strips, the overlying areas of said filter strips forming opaque areas, said system providing light source and focusing means for focusing undiffracted light impinging on said medium on said opaque areas and said green filter strips each having a width and spacing so that the portions of said magenta filter strip between said opaque areas are positioned and dimensioned to cooperate with said deformations of different spacings to select by different amounts of diffraction from the components of magenta the color of the light transmitted by the magenta filter strips.

11. An optical system for projecting colored light representative point-by-point of the color information contained in a light modulating medium in the form of deformations which diffract light corresponding to one color to be projected in a given direction and diffract light corresponding to the remaining colored light to be projected in a direction normal to said given direction comprising a filter color mask interposed in the path of light controlled by the medium and comprising a first plurality of spaced parallel filter strips of said one color and extending in the direction of diffraction of said one color and a plurality of spaced filter strips of the color of said remaining colored light and extending in the direction of diffraction of said remaining colored light and optically overlying said first plurality of filter strips, the overlying areas of said filter strips forming opaque areas, said system providing light source and focusing means for focusing undiffracted white light impinging on said medium on said opaque areas, undiffracted light of said one color on the filter strips of said remaining color and undiffracted light of said remaining color light on said filter strips of said one color.

12. The system of claim 9 wherein said light source and focusing means includes a filter mask similar to said first-mentioned filter color mask but optically displaced transversely of the projection path so that said opaque, said transparent, said one color and said remaining color areas of said second mask are optically opposite said transparent, said opaque, said remaining color and said one color portions, respectively, of said first-mentioned filter color mask.

References Cited by the Examiner

UNITED STATES PATENTS 2,813,146  11/1957  Glenn _____ 178—5.4

NORTON ANSHER, *Primary Examiner.*